US008943678B2

(12) United States Patent
Brown et al.

(10) Patent No.: US 8,943,678 B2
(45) Date of Patent: Feb. 3, 2015

(54) LIMIT INDICATOR FOR RAM OF WEDGE CONNECTOR

(75) Inventors: Lawrence Norman Brown, Barnstead, NH (US); Henry Arnold Maxwell, Pembroke, NH (US)

(73) Assignee: Hubbell Incorporated, Shelton, CT (US)

( * ) Notice: Subject to any disclaimer, the term of this patent is extended or adjusted under 35 U.S.C. 154(b) by 169 days.

(21) Appl. No.: 13/607,989

(22) Filed: Sep. 10, 2012

(65) Prior Publication Data

US 2013/0061471 A1 Mar. 14, 2013

Related U.S. Application Data

(60) Provisional application No. 61/573,148, filed on Sep. 14, 2011.

(51) Int. Cl.

| | |
|---|---|
| ***B23P 21/00*** | (2006.01) |
| ***B23Q 15/00*** | (2006.01) |
| ***H01R 43/027*** | (2006.01) |
| ***H01R 4/50*** | (2006.01) |

(52) U.S. Cl.

CPC .......... *H01R 43/0275* (2013.01); *H01R 4/5083* (2013.01)

USPC .................................. 29/720; 29/254; 29/748

(58) Field of Classification Search

USPC .................... 29/720, 254, 744, 748, 868, 872

See application file for complete search history.

(56) References Cited

U.S. PATENT DOCUMENTS

| | | | | |
|---|---|---|---|---|
| 3,212,534 | A * | 10/1965 | Broske | 140/113 |
| 4,667,502 | A | 5/1987 | Bush | |
| 4,722,189 | A | 2/1988 | Center | |
| RE33,098 | E | 10/1989 | Center | |
| 4,905,603 | A | 3/1990 | McBain | |
| 6,996,987 | B2 | 2/2006 | Gregory | |
| 7,736,203 | B2 | 6/2010 | Copper | |
| 8,028,675 | B2 | 10/2011 | Gagliano | |
| 2007/0240301 | A1 * | 10/2007 | Johnson et al. | 29/748 |
| 2009/0223042 | A1 | 9/2009 | Chadbourne | |

FOREIGN PATENT DOCUMENTS

| | | |
|---|---|---|
| EP | 1 458 055 | 9/2004 |
| WO | 2009111144 | 9/2009 |

OTHER PUBLICATIONS

European Search Report issued in EP 12 27 5139 dated Jan. 4, 2013.

* cited by examiner

*Primary Examiner* — Thiem Phan

(74) *Attorney, Agent, or Firm* — Roylance, Abrams, Berdo & Goodman, L.L.P.

(57) ABSTRACT

A wedge connector assembly including an installation tool having a tool body and a frame connected to the tool body. A sleeve is received by the frame and a wedge is received by the sleeve. A firing mechanism is movably connected to the tool body. A movable ram extends from the tool body into the frame such that movement of the ram drives the wedge into the sleeve when the installation tool is fired. A piston is movably disposed in the tool body between the ram and the firing mechanism. The piston is moved when the firing mechanism is activated, thereby driving the wedge into the sleeve. An indicator disposed on the ram indicates when the installation tool is in a proper firing position to substantially prevent over-torquing the installation tool.

16 Claims, 3 Drawing Sheets

LIMIT INDICATOR FOR RAM OF WEDGE CONNECTOR

CROSS REFERENCE TO RELATED APPLICATION

This application claims the benefit under 35 U.S.C. §119 (e) of U.S. Provisional Application Ser. No. 61/573,148, filed Sep. 14, 2011, which is hereby incorporated by reference in its entirety.

FIELD OF THE INVENTION

The present invention relates generally to a limit indicator for a ram of a wedge connector. Still more particularly, the present invention relates to a limit indicator for preventing over-torquing of a ram of a wedge connector prior to installation.

BACKGROUND OF THE INVENTION

A wedge connector includes an installation tool that drives a wedge into a sleeve to electrically and mechanically connect two cables. The two cables are passed through the sleeve on opposite sides of the wedge. Conventional installation tools use a powder cartridge to obtain a sufficient force to drive the wedge into the sleeve to securely retain the cables between the wedge and the sleeve.

In a non-firing position, a spring spaces a firing pin from a load cell in the installation tool. Torque is applied to the installation tool to compress the spring and move the load cell adjacent to the firing pin, thereby putting the installation tool in a firing position.

However, problems have occurred in operating conventional installation tools in removing the tools from installed wedges. When readying the installation tool for firing, users can over-torque the installation tool when compressing the spring. The over-torquing causes the ram to start to push the wedge into the sleeve. When the installation tool is fired, gas is generated in the tool housing to drive the wedge into the sleeve. Over-torquing the installation tool causes the ram to start to push the wedge into the sleeve such that some of the generated gas remains in the tool housing after the wedge has been driven by the ram. The gas remaining in the tool housing keeps a piston in engagement with the ram, thereby making removal of the installation tool difficult. Accordingly, a need has been discovered for a wedge connector in which over-torquing of the installation tool is substantially prevented.

SUMMARY OF THE INVENTION

An object of the present invention is to provide an installation tool that prevents over-torquing of an installation tool.

Another object of the present invention is to provide an installation tool in which the installation tool is easily removed from the wedge after installation.

In accordance with an aspect of the present invention, a wedge connector assembly includes an installation tool having a tool body and a frame connected to the tool body. A sleeve is received by the frame and a wedge is received by the sleeve. A firing mechanism is movably connected to the tool body. A movable ram extends from the tool body into the frame such that movement of the ram drives the wedge into the sleeve when the installation tool is fired. A piston is movably disposed in the tool body between the ram and the firing mechanism. The piston is moved when the firing mechanism is activated, thereby driving the wedge into the sleeve. An indicator disposed on the ram indicates when the installation tool is in a proper firing position to substantially prevent over-torquing the installation tool.

In accordance with another aspect of the present invention, a method is provided of connecting cables with an installation tool. A tool body is rotated to put the installation tool in a firing position. The rotation of the tool body is stopped when indicated by an indicator to substantially prevent over-torquing the installation tool. A firing mechanism is activated to drive a wedge into a sleeve to secure the cables between the wedge and the sleeve.

Objects, advantages, and salient features of the invention will become apparent from the following detailed description, which, taken in conjunction with the annexed drawings, discloses an exemplary embodiment of the present invention.

As used in this application, the terms “front,” “rear,” “upper,” “lower,” “upwardly,” “downwardly,” and other orientational descriptors are intended to facilitate the description of an exemplary embodiment of the present invention, and are not intended to limit the structure thereof to any particular position or orientation.

BRIEF DESCRIPTION OF THE DRAWINGS

The above benefits and other advantages of the various embodiments of the present invention will be more apparent from the following detailed description of exemplary embodiments of the present invention and from the accompanying drawing figures, in which.

Throughout the drawings, like reference numerals will be understood to refer to like parts, components and structures.

DETAILED DESCRIPTION OF EXEMPLARY EMBODIMENT

Figure 1:
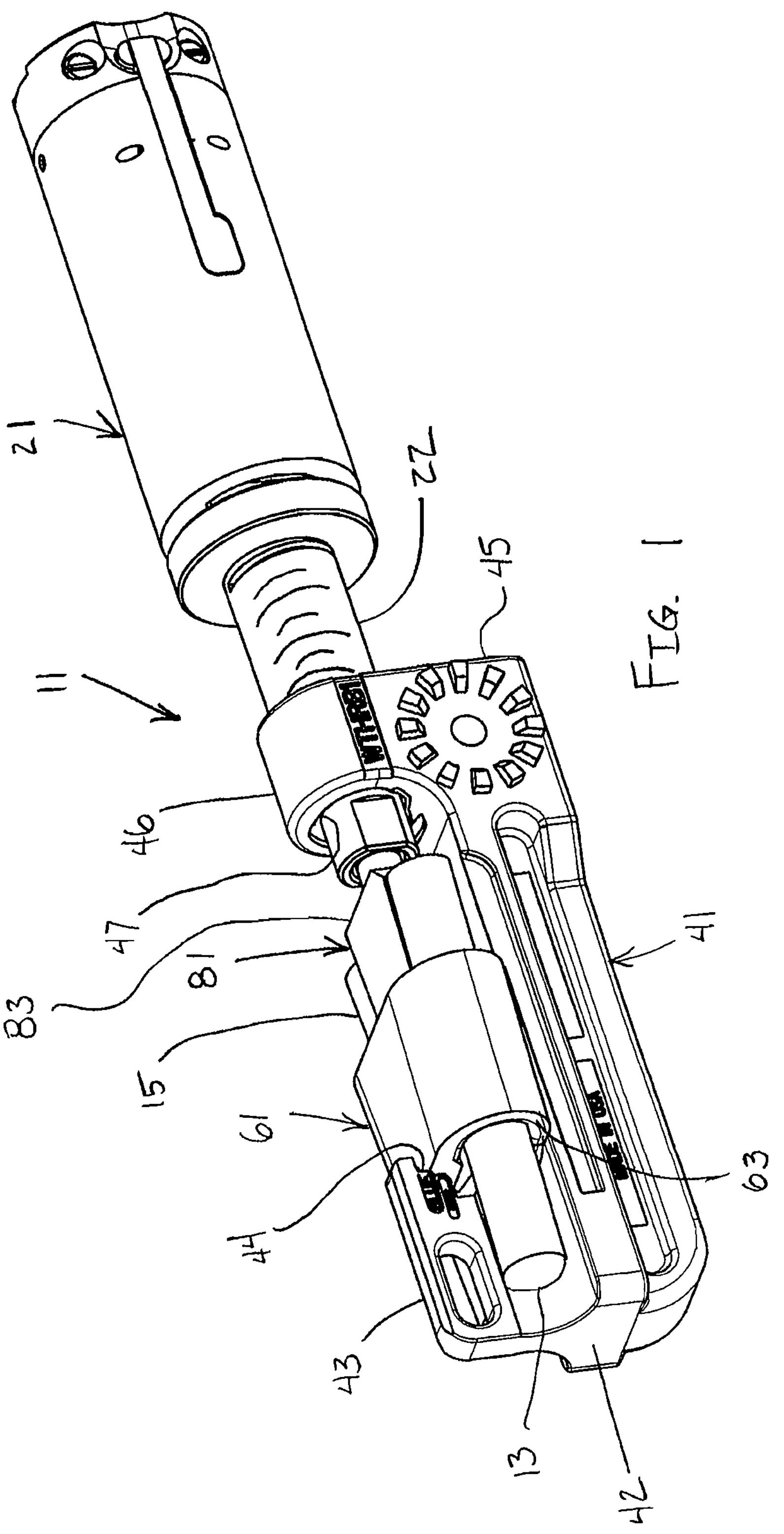
FIG. 1 is a perspective view of a wedge connector in accordance with an exemplary embodiment of the present invention.
Figure 6:
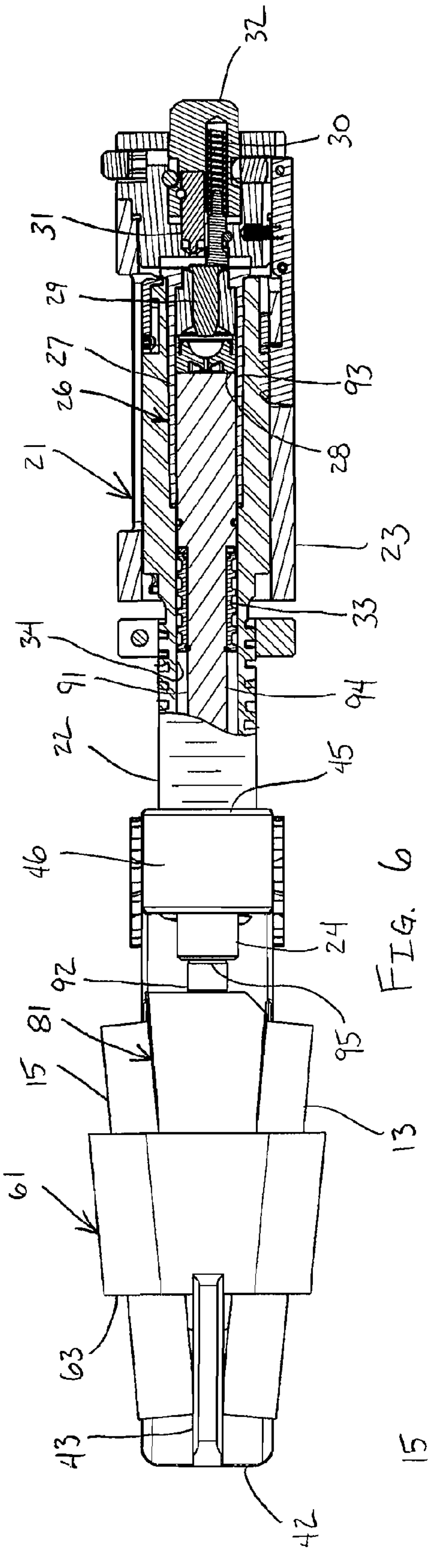
FIG. 6 is a top plan view in partial cross section of the wedge connector of FIG. 1 in which the installation tool is in a non-firing position.
Figure 7:
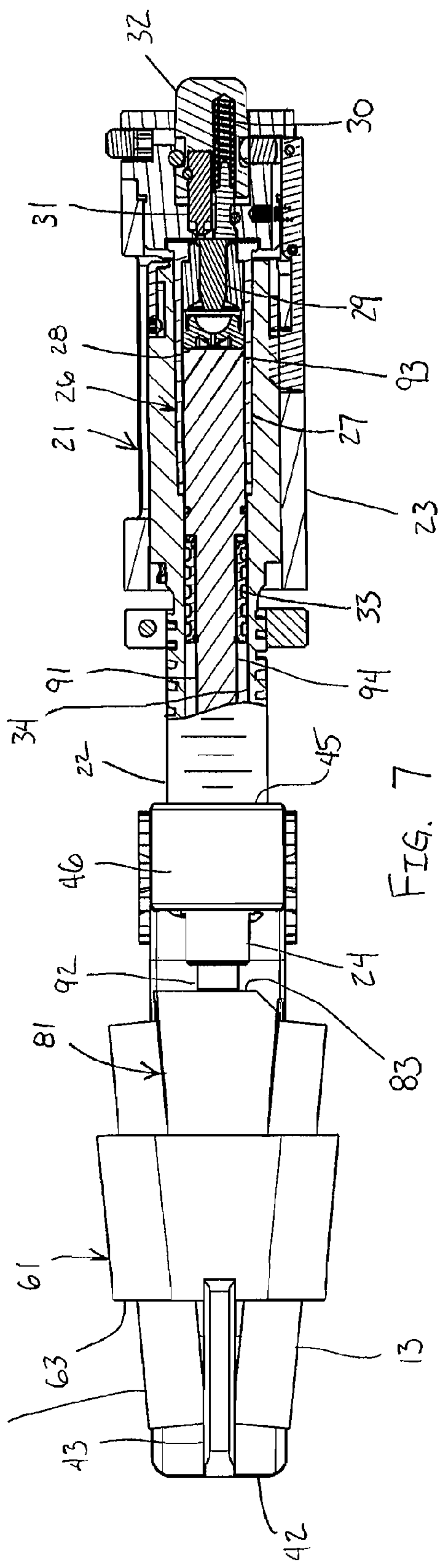
FIG. 7 is a top plan view in partial cross section of the wedge connector of FIG. 1 in which the installation tool is in a firing position.

The wedge connector 11 includes an installation tool 21, a frame 41, a sleeve 61 and a wedge 81, as shown in FIGS. 1, 6 and 7. The installation tool 21 drives the wedge 81 into the sleeve 61 to securely retain wires, or conductors, 13 and 15 between the wedge 81 and the sleeve 61, thereby electrically connecting the wires 13 and 15.

The frame 41 has a front end 42 forming an anvil section 43. The anvil section 43 includes a sleeve receiving portion 44 for receiving a front end 63 of a sleeve 61. A rear end 45 of the frame 41 forms a tool supporting portion 46 having a threaded bore 47 for receiving a threaded portion 22 of a tool body 23. The threaded portion 22 of the tool body 23 is threaded through the bore 47 of the frame 41 to support the installation tool 21 and align a ram 91 of the installation tool 21 with a longitudinal axis of the frame 41.

The tool body 23 includes an end bearing 24 connected to the threaded portion 22, as shown in FIGS. 2-5. A firing mechanism is connected to the tool body 23 to activate the installation tool 21 when in the firing position. A chamber 25 in the tool body 23 receives a booster assembly 26, as shown in FIGS. 6 and 7. The booster assembly 26 includes a sleeve 27, a piston 28 and a power cell 29, such as a cartridge, as shown in FIGS. 6 and 7. The piston 28 and power cell 29 are disposed within the sleeve 27. The spring member 30 biases the firing pin 31 away from the power cell 29 to prevent accidentally exploding the power cell, as shown in FIG. 6.

The ram 91 is movably disposed in the tool body 23, as shown in FIGS. 6 and 7. A first end 92 of the ram 91 extends externally of the end bearing 24. A second end 93 of the ram 91 is disposed within the tool body 23 and abuts the piston 28 within the sleeve 27 of the booster assembly 26. An inner bearing 33 is disposed on an outer surface 94 of the ram 91 to permit axial movement of the ram 91 through a bore 34 of the tool body 23. An identifier 97, such as a trademarked logo, can be disposed on the first end 92 of the ram 91. The identifier 97 is imprinted on the wedge 81 when the wedge is driven into the sleeve 61 by the ram 91.

Figure 3:
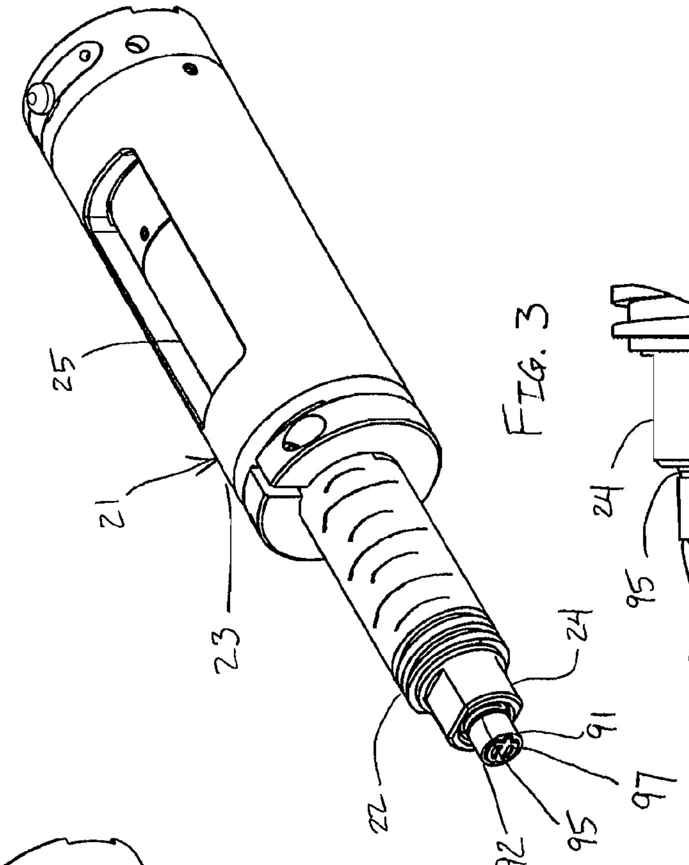
FIG. 3 is a perspective view of an installation tool in a non-firing position.
Figure 5:
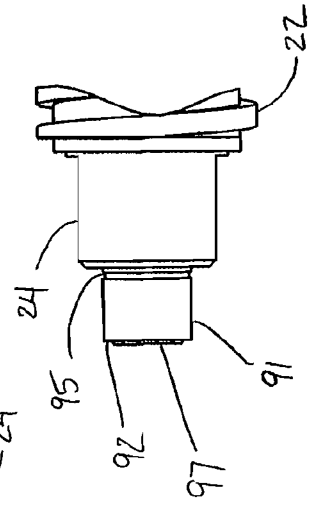
FIG. 5 is a partial side elevational view of a ram of the installation tool of FIG. 3.

A limit indicator 95 is disposed on the outer surface 94 of the ram 91 proximal the first end 92, as shown in FIGS. 3, 5 and 6. Installation tool 21, except for the limit indicator 95, is conventional and is disclosed further in the English portion of the 2011 Burndy Safety Operating & Maintenance Instructions for the Burndy WEJTAP System, the entire disclosure of which is hereby incorporated by reference (available from the Burndy Tool Service Center in Littleton, N.H.). The tool body 23 is rotated to put the installation tool 21 in a firing position, as shown in FIG. 7. The end bearing 24 rotates with the tool body 23. When the end bearing 24 is moved over the limit indictor 95 such that the limit indicator 95 is no longer visible, the installation tool 21 is in the firing position. Accordingly, the user knows to stop rotating the tool body 23 when the limit indicator 95 is no longer visible, as shown in FIG. 7, thereby substantially preventing over-torquing. The limit indicator 95 can be any type of indicator on the ram 91 that is visible to the user. For example, the limit indicator 95 can be, but is not limited to, a line painted on an outer surface of the ram 91, a groove formed in the outer surface of the ram 91, a line painted in a groove formed in the outer surface of the ram 91, or an indicator ring disposed on an outer surface of the ram 91. The limit indicator 95 can be a permanent indicator or a temporary indicator that wears off over time as the user becomes more familiar with the installation tool 21.

In a non-firing position, as shown in FIGS. 3, 5 and 6, the spring 30 biases the firing pin 31 away from the power cell 29, thereby substantially preventing accidentally exploding the power cell. The limit indicator 95 on the ram 91 is visible when the installation tool is in a non-firing position. The first end 92 of the ram 91 contacts the first end 83 of the wedge 81.

Figure 2:
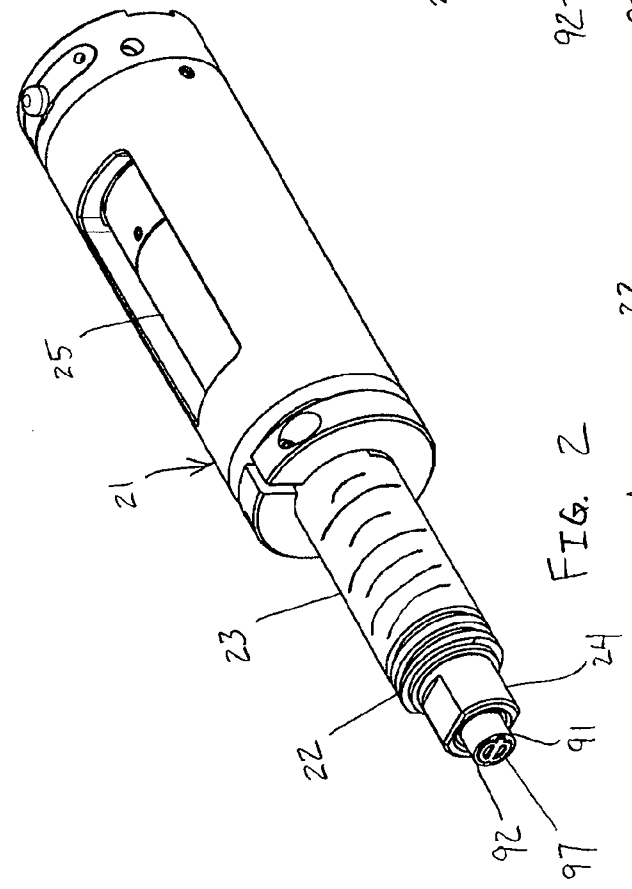
FIG. 2 is a perspective view of an installation tool in a firing position.
Figure 4:
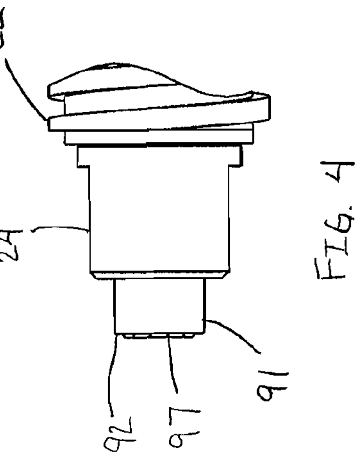
FIG. 4 is a partial side elevational view of a ram of the installation tool of FIG. 2.

To put the installation tool 21 in a firing position, as shown in FIGS. 2, 4 and 7, the tool body 23 is rotated to overcome the biasing force of the compression spring 30. The tool body 23 is rotated resulting in axial movement of the tool body 23, including the end bearing 24. The inner bearing 33 allows the tool body 23 to be rotated about the ram 91 without moving the ram. Axial movement of the tool body 23 results in the spring 30 being compressed and the firing pin 31 being moved to a position abutting the power cell 29. The axial movement of the tool body 23 also results in axial movement of the end bearing 24, which covers the limit indicator 95. When the limit indicator 95 is no longer visible, the proper torque is obtained for firing the installation tool 21. The user stops rotating the tool body 23, thereby substantially preventing over-torquing of the installation tool 21. Accordingly, by substantially preventing over-torquing, the user is prevented from beginning to insert the wedge 81 into the sleeve 61.

To fire the installation tool 21, a hammer, or other suitable tool, is used to strike the firing button 32. The inward axial movement (to the left in FIG. 7) of the firing button 32 causes axial movement of the firing pin 31, which penetrates the power cell 29 and causes the power cell 29 to explode. The gas generated by the explosion of the power cell 29 moves the piston 28 axially causing the piston to strike the ram 91, which is driven axially through the bore 34 of the tool body 23. The first end 92 of the ram 91 pushes the wedge 81 further into the sleeve 61, thereby mechanically securing the cables 13 and 15 between the wedge 81 and the sleeve 61. When the piston 28 and ram 91 stop moving, the piston 28 welds to the inner wall of the sleeve 27, thereby storing the generated gas pressure behind the piston. When the installation tool 21 is turned off, the stored generated gas vents through the piston 28 and down through the bore 34. The gas exits the tool 21 between the ram 91 and the end bearing 24.

When the installation tool 21 is not over-torqued, the generated gases are expelled from the tool body 23. The tool body 23 can then be rotated away from the wedge 81 creating a gap between the piston 28 and the second end 93 of the ram 91, such that the ram 91 can be moved away from the wedge 81. The installation tool 21, including the frame 41, can be removed from the sleeve 61 and wedge 81. The used booster assembly 26 can then be removed from the tool body 23 and replaced with a new booster assembly to electrically and mechanically connect two other cables with another sleeve 61 and wedge 81.

When a user over-torques the tool body 23, the power cell 29 and piston 28 begin to push the second end 93 of the ram 91 such that the ram 91 starts pushing the wedge 81 into the sleeve 61. Thus, when the installation tool 21 is fired, the wedge 81 does not need to be pushed as far into the sleeve 61 because the wedge 81 has already been partially pushed into the sleeve 61 by over-torquing the tool body 23. Thus, not all of the gas generated by the exploding power cell 29 is used to drive the ram 91. The remaining gas makes axial movement of the ram 91 away from the wedge 81 (to the right in FIG. 7) extremely difficult after the wedge has been installed, thereby making removal of the installation tool 21 from the assembled sleeve 61 and wedge 81 extremely difficult. By providing the ram 91 with a limit indicator 95 to prevent over-torquing the installation tool 21, this problem is substantially prevented and the installation tool 21 can be easily removed following use.

The foregoing embodiment and advantages are merely exemplary and are not to be construed as limiting the scope of the present invention. The description of an exemplary embodiment of the present invention is intended to be illustrative, and not to limit the scope of the present invention. Various modifications, alternatives and variations will be apparent to those of ordinary skill in the art, and are intended to fall within the scope of the invention as defined in the appended claims and their equivalents.

What is claimed is:

1. A wedge connector assembly, comprising:

an installation tool including a tool body and a frame connected to said tool body;

a firing mechanism movably connected to said tool body;

a sleeve received by said frame a wedge received by said sleeve;

a movable ram extending from said tool body into said frame;

a piston movably disposed in said tool body between said ram and said firing mechanism, said piston being moved when said firing mechanism is activated, thereby driving said wedge into said sleeve; and an indicator disposed on said ram to indicate when said installation tool is in a proper firing position to substantially prevent over-torquing said installation tool.

2. The wedge connector assembly according to claim 1, wherein said indicator is visible when said installation tool is in a non-firing position and said indicator not being visible when said installation tool is in said firing position.

3. The wedge connector assembly according to claim 1, wherein said sleeve is substantially C-shaped.

4. The wedge connector assembly according to claim 1, wherein said indicator is a colored ring to facilitate visibility.

5. The wedge connector assembly according to claim 1, wherein said tool body is rotated with respect to said ram to put said installation tool in said firing position.

6. The wedge connector assembly according to claim 1, wherein said indicator is a groove formed on an outer surface of said ram.

7. The wedge connector assembly according to claim 6, wherein a colored line is disposed in said groove to facilitate visibility thereof.

8. The wedge connector assembly according to claim 1, wherein said indicator is a colored line disposed circumferentially around an outer surface of said ram.

9. The wedge connector assembly according to claim 1, wherein said indicator is temporarily disposed on said ram.

10. The wedge connector assembly according to claim 1, wherein said ram has a free end to engage said wedge, said indicator being disposed proximal said free end.

11. The wedge connector assembly according to claim 1, wherein an explosive power cell disposed in said tool body is exploded to drive said ram.

12. The wedge connector assembly according to claim 11, wherein a spring member biases a firing pin away from said power cell in a non-firing position.

13. The wedge connector assembly according to claim 12, wherein rotation of said tool body to said firing position compresses said spring member.

14. The wedge connector assembly according to claim 1, wherein an end bearing is fixedly connected to said tool body.

15. The wedge connector assembly according to claim 14, wherein said end bearing covers said indicator when said installation tool is in said firing position.

16. A wedge connector assembly, comprising:

an installation tool including a tool body and a frame connected to said tool body;

a firing mechanism movably connected to said tool body;

a substantially C-shaped sleeve received by said frame a wedge received by said sleeve;

a movable ram extending from said tool body into said frame;

a piston movably disposed in said tool body between said ram and said firing mechanism, said piston being moved when said firing mechanism is activated, thereby driving said wedge into said sleeve; and an indicator disposed on said ram to indicate when said installation tool is in a proper firing position to substantially prevent over-torquing said installation tool, wherein said tool body is rotated with respect to said ram to put said installation tool in said firing position, and said indicator is visible when said installation tool is in a non-firing position and said indicator not being visible when said installation tool is in said firing position.

* * * * *